United States Patent
Lu et al.

(10) Patent No.: US 11,297,246 B2
(45) Date of Patent: Apr. 5, 2022

(54) PHOTOGRAPHY CONTROL METHOD, DEVICE, NON-TRANSITORY STORAGE MEDIUM AND SYSTEM OF INTELLIGENT PHOTOGRAPHY SYSTEM

(71) Applicant: Wuhan Lianyi Heli Technology Co., Ltd, Wuhan (CN)

(72) Inventors: Yu Lu, Wuhan (CN); Bin Chen, Wuhan (CN); Yong Li, Wuhan (CN); Yuni Chen, Wuhan (CN); Zhiwei Gong, Wuhan (CN); Xinyu Ye, Wuhan (CN); Wenming Tang, Wuhan (CN)

(73) Assignee: Wuhan Lianyi Heli Technology Co., Ltd, Wuhan (CN)

( * ) Notice: Subject to any disclaimer, the term of this patent is extended or adjusted under 35 U.S.C. 154(b) by 0 days.

(21) Appl. No.: 17/093,894

(22) Filed: Nov. 10, 2020

(65) Prior Publication Data

US 2021/0144308 A1    May 13, 2021

(30) Foreign Application Priority Data

Nov. 12, 2019   (CN) .......................... 201911105469.0

(51) Int. Cl.
*H04N 5/232*   (2006.01)
*H04N 5/225*   (2006.01)

(52) U.S. Cl.
CPC ... *H04N 5/23299* (2018.08); *H04N 5/225251* (2018.08); *H04N 5/23203* (2013.01); *H04N 5/23293* (2013.01); *H04N 5/23296* (2013.01)

(58) Field of Classification Search
CPC ......... H04N 5/23299; H04N 5/225251; H04N 5/23203; H04N 5/23293; H04N 5/23296; H04N 5/232061; H04N 5/232935
See application file for complete search history.

(56) References Cited

U.S. PATENT DOCUMENTS

2015/0077568 A1*  3/2015  Tsunematsu ..... G08B 13/19645
                                                        348/159

FOREIGN PATENT DOCUMENTS

| CN | 103105858 A | 5/2013 |
|---|---|---|
| CN | 105933660 A | 9/2016 |

(Continued)

OTHER PUBLICATIONS

First Office Action in counterpart Chinese Patent Application No. 201911105469.0, dated Dec. 25, 2020.

(Continued)

*Primary Examiner* — Yogesh K Aggarwal (74) *Attorney, Agent, or Firm* — Westbridge IP LLC (57) ABSTRACT

Disclosed are a photography control method, device, non-transitory storage medium and system of an intelligent photography system. The photography control method of the intelligent photography system includes: acquiring a target positioning image shot by the search camera and a view-finder screen image shot by the shooting camera, and transmitting the target positioning image and the viewfinder screen image to a remote terminal for the remote terminal to generate a search camera angle adjustment instruction according to the target positioning image and the viewfinder screen image; receiving the search camera angle adjustment instruction sent by the remote terminal; and acquiring an angle adjustment parameter according to the search camera angle adjustment instruction to control the search camera to adjust an angle.

8 Claims, 5 Drawing Sheets

(56) References Cited

FOREIGN PATENT DOCUMENTS

| | | |
|---|---|---|
| CN | 107396067 A | 11/2017 |
| CN | 110266943 A | 9/2019 |

OTHER PUBLICATIONS

Second Office Action in counterpart Chinese Patent Application No. 201911105469.0, dated Jul. 12, 2021.

* cited by examiner

Fig. 1

| Acquiring a target positioning image shot by the search camera and a viewfinder screen image shot by the shooting camera, and transmitting the target positioning image and the viewfinder screen image to a remote end for the remote end to generate a search camera angle adjustment instruction according to the target positioning image and the viewfinder screen image | — S10 |

| Receiving the search camera angle adjustment instruction sent by the remote end | — S20 |

| Acquiring an angle adjustment parameter according to the search camera angle adjustment instruction to control the search camera to adjust an angle | — S30 |

PHOTOGRAPHY CONTROL METHOD, DEVICE, NON-TRANSITORY STORAGE MEDIUM AND SYSTEM OF INTELLIGENT PHOTOGRAPHY SYSTEM

CROSS REFERENCE TO RELATED APPLICATIONS

This application claims the benefit of Chinese Patent Application No. 201911105469.0, filed on Nov. 12, 2019 and entitled "Photography Control Method, Device, Storage Medium and System of Intelligent Photography System", the entirety of which is hereby incorporated herein by reference.

TECHNICAL FIELD

This application relates to the field of intelligent photography, in particular to a photography control method, device, non-transitory storage medium and system of an intelligent photography system.

BACKGROUND

With the development of camera technology, there are more and more eco-photography enthusiasts and sports photography enthusiasts who take natural creatures as their subjects. This type of photography requires that the photographer must observe the state of the subject in real time. In most common photography methods, cameras are handheld for operation and mechanical tripod heads are manually operated. The photographer must be under extreme shooting conditions and difficult shooting methods for a long time.

In this way, the best shooting time will often be missed, which cannot meet the requirements of real-time shooting, image transmission quality and distance control in ecological and sports photography.

SUMMARY

The main object of this application is to provide a photography control method, device, non-transitory storage medium, and system of an intelligent photography system, which solves the problem that remote photography cannot be performed. However, in remote intelligent photography, how to ensure that the image displayed by the target search is basically identical with the image of the camera is an urgent problem to be solved.

In order to achieve the above object, this application provides a photography control method of an intelligent photography system. The intelligent photography system includes a search camera and a shooting camera. The photography control method of the intelligent photography system includes:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

In an embodiment, the search camera is located above the shooting camera and is rotatable in up and down direction for adjustment.

In the operation of acquiring an angle adjustment parameter according to the search camera angle adjustment instruction to control the search camera to adjust an angle: the angle adjustment parameter is a pitch angle of the search camera flipping up and down.

In an embodiment, in the operation of acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image: the target positioning image and the viewfinder screen image are transmitted to the remote terminal by wired transmission; and/or, the intelligent photography system further includes a viewfinder camera, and in the operation of acquiring a viewfinder screen image shot by the shooting camera: the viewfinder screen image shot by the shooting camera is acquired through the viewfinder camera.

In an embodiment, the intelligent photography system further includes a monitoring camera, before acquiring a target positioning image shot by the search camera and transmitting the target positioning image to a remote terminal, the photography control method further includes:

acquiring an environmental monitoring image shot by the monitoring camera;

transmitting the environmental monitoring image to the remote terminal;

receiving a shooting search instruction sent by the remote terminal; and controlling the search camera to shoot according to the shooting search instruction.

In an embodiment, after acquiring an angle adjustment parameter according to the search camera angle adjustment instruction to control the search camera to adjust an angle, the photography control method further includes:

receiving a shooting control instruction sent by the remote terminal;

acquiring a shooting parameter according to the shooting control instruction to control the shooting camera to shoot; and acquiring a target image shot by the shooting camera.

In an embodiment, after acquiring a target image shot by the shooting camera, the photography control method further includes:

transmitting the target image to the remote terminal;

receiving a shooting adjustment instruction sent by the remote terminal;

adjusting the shooting parameter according to the shooting adjustment instruction to control the shooting camera to shoot after adjustment; and acquiring a target image shot by the shooting camera after adjustment.

This application further provides a photography control device of an intelligent photography system, including a memory, a processor, and a photography control program of the intelligent photography system stored on the memory and executable on the processor, and the photography control program of the intelligent photography system is configured to implement the operations of the photography control method, and the photography control method of the intelligent photography system includes:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

This application further provides a non-transitory storage medium on which the photography control program of the intelligent photography system is stored, and the photography control program of the intelligent photography system, when executed by a processor, implements the operations of the photography control method, and the photography control method of the intelligent photography system includes:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

This application further provides an intelligent photography system, including: an intelligent tripod head, a search camera, a shooting camera, a communication module and a photography control device of the intelligent photography system; where, the search camera includes a wide-angle lens and is fixed on the shooting camera for shooting a target positioning image;

the shooting camera includes a camera lens, an orientation of the camera lens is the same as an orientation of the wide-angle lens, and the shooting camera is installed on the intelligent tripod head to shoot a target image;

the communication module is fixed on the intelligent tripod head for communication with a remote terminal; and the photography control device of the intelligent photography system is fixedly installed on the intelligent tripod head and is electrically connected to the intelligent tripod head, the shooting camera, the search camera, and the communication module; the photography control device of the intelligent photography system includes a memory, a processor, and a photography control program of the intelligent photography system stored on the memory and executable on the processor, the photography control program of the intelligent photography system being configured to implement the operations of the photography control method, the photography control method of the intelligent photography system including:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

In an embodiment, the intelligent photography system further includes a viewfinder camera fixed on the shooting camera for acquiring a viewfinder image of the shooting camera; and/or, the intelligent photography system further includes a monitoring camera for acquiring an environmental monitoring image shot by the monitoring camera.

In the technical solution of this application, a target positioning image shot by a search camera and a viewfinder screen image shot by a shooting camera are acquired, and the target positioning image and the viewfinder screen image are transmitted to a remote terminal, so that the remote terminal may generate a search camera angle adjustment instruction according to the target positioning image and the viewfinder screen image; the search camera angle adjustment instruction sent by the remote terminal is received; an angle adjustment parameter is acquired according to the search camera angle adjustment instruction to control the search camera to adjust an angle so that a screen displayed by the target search basically overlaps with a screen of the shooting camera, so that a screen displayed by the target search may be shot in time, the best shooting opportunity is acquired, and a better shooting effect is acquired. While taking pictures, videos may also be recorded by the search camera, and the search camera may be controlled to adjust the angle, which may better ensure that the shooting photo is consistent with the recorded video viewfinder.

BRIEF DESCRIPTION OF THE DRAWINGS

In order to more clearly explain the embodiments of this application or the technical solutions in the prior art, the following will briefly introduce the drawings required in the embodiments or the description of the prior art. Obviously, the drawings in the following description are only some embodiments of this application. For those of ordinary skill in the art, without paying any creative work, other drawings can be obtained according to the structures shown in these drawings.

DETAILED DESCRIPTION OF THE EMBODIMENTS

It should be understood that the specific embodiments described herein are only used to explain this application, and are not intended to limit this application.

Figure 1:
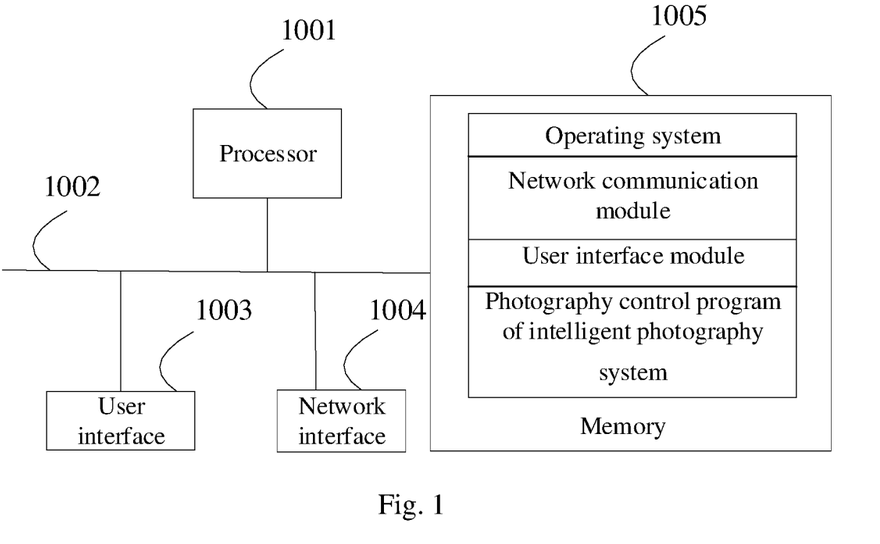
FIG. 1 is a schematic structural diagram of a server of a hardware operating environment according to an embodiment of this application.

Referring to FIG. 1, FIG. 1 is a schematic structural diagram of a photography control device of an intelligent photography system of this application.

As shown in FIG. 1, the photography control device of the intelligent photography system may include a processor 1001, such as a CPU, a communication bus 1002, a user interface 1003, a network interface 1004, and a memory 1005. The communication bus 1002 is configured to implement connection communication between these components. The user interface 1003 may include a display, an input unit such as a keyboard, and optionally the user interface 1003 may further include a standard wired interface and a wireless interface. The network interface 1004 may optionally include a standard wired interface and a wireless interface (such as a WI-FI interface). The memory 1005 may be a high-speed RAM memory or a stable memory (non-volatile memory), such as a disk memory. Optionally, the memory 1005 may be a storage device independent of the foregoing processor 1001.

Those skilled in the art may understand that the structure shown in FIG. 1 does not constitute a limitation on the photography control device of the intelligent photography system, and more or less components than those illustrated may be included, or certain components may be combined, or different components may be arranged.

As shown in FIG. 1, the memory 1005 as a computer storage medium may include an operating system, a network communication module, a user interface module, and a photography control program of an intelligent photography system.

In the server shown in FIG. 1, the network interface 1004 is mainly configured to connect terminal devices and communicate with the terminal devices; the user interface 1003 is mainly configured to receive input instructions from the administrator; the server calls stored on the memory 1005 through the processor 1001 and perform the following operations:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

In an embodiment, the processor 1001 calls the photography control program of the intelligent photography system stored on the memory 1005, and further performs the following operations: acquiring an environmental monitoring image shot by the monitoring camera;

transmitting the environmental monitoring image to the remote terminal;

receiving a shooting search instruction sent by the remote terminal; and controlling the search camera to shoot according to the shooting search instruction.

In an embodiment, the processor 1001 calls the photography control program of the intelligent photography system stored on the memory 1005, and further performs the following operations:

receiving a shooting control instruction sent by the remote terminal;

acquiring a shooting parameter according to the shooting control instruction to control the shooting camera to shoot; and acquiring a target image shot by the shooting camera.

In an embodiment, the processor 1001 calls the photography control program of the intelligent photography system stored on the memory 1005, and further performs the following operations:

transmitting the target image to the remote terminal;

receiving a shooting adjustment instruction sent by the remote terminal;

adjusting the shooting parameter according to the shooting adjustment instruction to control the shooting camera to shoot after adjustment; and acquiring a target image shot by the shooting camera after adjustment.

In this application, a target positioning image shot by a search camera and a viewfinder screen image shot by a shooting camera are acquired, and the target positioning image and the viewfinder screen image are transmitted to a remote terminal, so that the remote terminal may generate a search camera angle adjustment instruction according to the target positioning image and the viewfinder screen image; the search camera angle adjustment instruction sent by the remote terminal is received; an angle adjustment parameter is acquired according to the search camera angle adjustment instruction to control the search camera to adjust an angle so that a screen displayed by the target search basically overlaps with a screen of the shooting camera, so that a screen displayed by the target search may be shot in time, the best shooting opportunity is acquired, and a better shooting effect is acquired. While taking pictures, videos may also be recorded by the search camera, and the search camera may be controlled to adjust the angle, which may better ensure that the shooting photo is consistent with the recorded video viewfinder.

Based on the above hardware structures, FIGS. 2 to 5 show embodiments of the photography control method of the intelligent photography system provided by this application.

Figure 2:
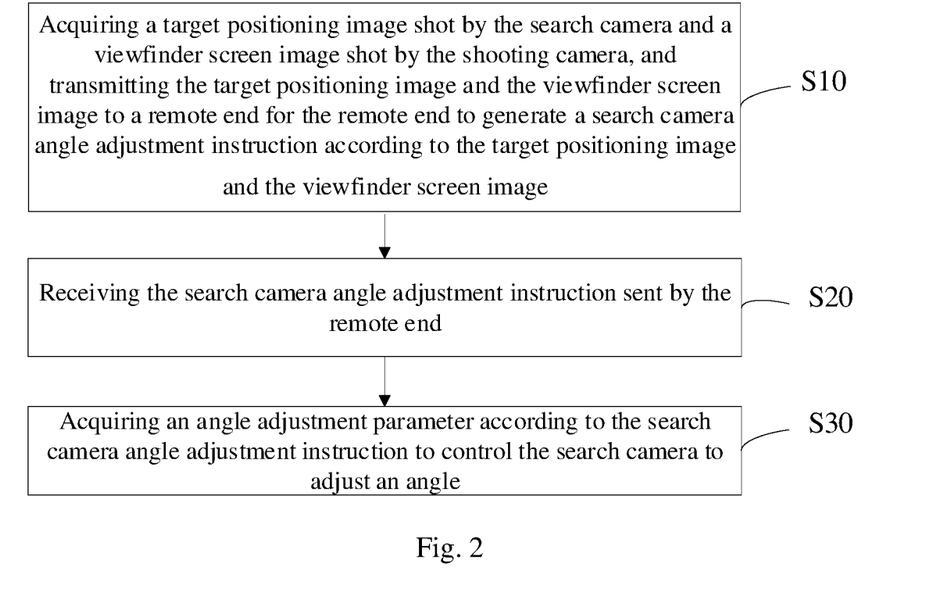
FIG. 2 is a schematic flowchart of a photography control method of an intelligent photography system according to a first embodiment of this application.

Please refer to FIG. 2. FIG. 2 is a schematic flowchart of a photography control method of an intelligent photography system according to a first embodiment of this application. In this embodiment, the photography control method of the intelligent photography system includes operations as follows.

S10, acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image.

It should be noted that the search camera adopts a wide-angle lens and has a wider field of view. The search camera may quickly find a target, and then the shooting camera may quickly capture the shooting picture. After the target positioning image shot by the search camera and the viewfinder screen image shot by the shooting camera are acquired, the target positioning image and the viewfinder screen image are transmitted to the remote terminal. A deviation angle of these two images is determined at the remote terminal, and the remote terminal generates the search camera angle adjustment instruction according to the target positioning image and the viewfinder screen image. For example, according to different focal lengths, these two images will show an angle difference, and these two images need to be adjusted accordingly to overlap with each other as much as possible.

S20, receiving the search camera angle adjustment instruction sent by the remote terminal.

It should be noted that the remote terminal may include a remote control handle and a display screen, and the photographer may move the remote control handle according to the angle difference displayed on the display screen to generate the search camera angle adjustment instruction.

S30, acquiring an angle adjustment parameter according to the search camera angle adjustment instruction to control the search camera to adjust an angle.

It should be noted that, after receiving the search camera angle adjustment instruction sent by the remote terminal, the angle adjustment parameter is acquired according to the search camera angle adjustment instruction, and the corresponding adjustment component is controlled to adjust the angle of the search camera.

It should be noted that, according to the different positions between the search camera and the shooting camera, different angles may be selected to adjust, for example, a horizontal angle, a tilt angle, etc. In an embodiment, the search camera is located above the shooting camera and is rotatable in up and down direction for adjustment. In the operation of acquiring an angle adjustment parameter according to the search camera angle adjustment instruction to control the search camera to adjust an angle: the angle adjustment parameter is a pitch angle of the search camera flipping up and down.

In addition, the target positioning image and the viewfinder screen image may be transmitted to the remote terminal in a wireless transmission mode or a wired transmission mode. In an embodiment, the target positioning image and the viewfinder screen image are transmitted to the remote terminal by wired transmission.

It should be noted that the permission of the shooting camera may be directly obtained to acquire the viewfinder screen image. Certainly, when there is no permission, a viewfinder camera may be additionally set to view in real time. In an embodiment, the intelligent photography system further includes a viewfinder camera. In the operation of acquiring a viewfinder screen image shot by the shooting camera: the viewfinder screen image shot by the shooting camera is acquired through the viewfinder camera. The external viewfinder camera may adapt to more cameras with better effect.

In this application, a target positioning image shot by a search camera and a viewfinder screen image shot by a shooting camera are acquired, and the target positioning image and the viewfinder screen image are transmitted to a remote terminal, so that the remote terminal may generate a search camera angle adjustment instruction according to the target positioning image and the viewfinder screen image; the search camera angle adjustment instruction sent by the remote terminal is received; an angle adjustment parameter is acquired according to the search camera angle adjustment instruction to control the search camera to adjust an angle so that a screen displayed by the target search basically overlaps with a screen of the shooting camera, so that a screen displayed by the target search may be shot in time, the best shooting opportunity is acquired, and a better shooting effect is acquired.

Figure 3:
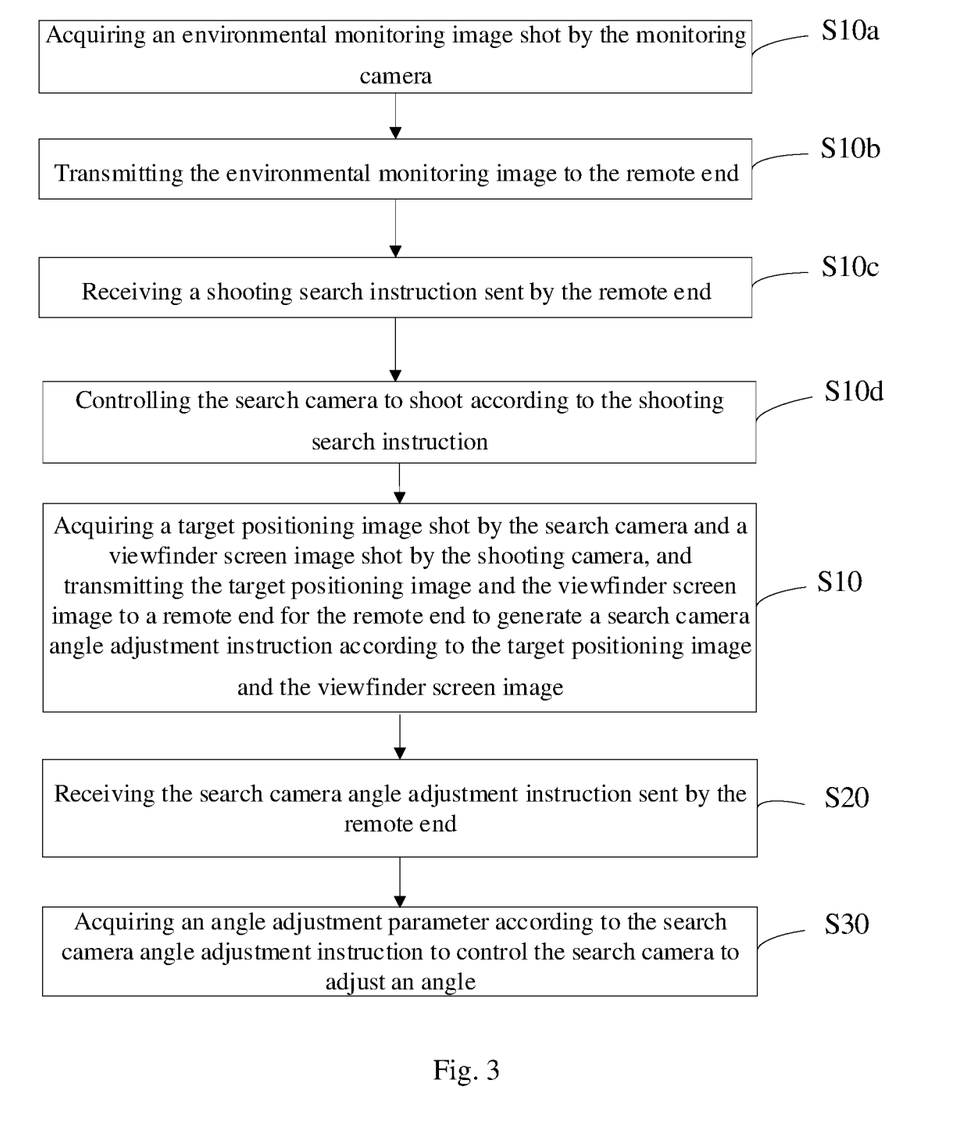
FIG. 3 is a schematic flowchart of the photography control method of the intelligent photography system according to a second embodiment of this application.

Please refer to FIG. 3, FIG. 3 is a schematic flowchart of the photography control method of the intelligent photography system according to a second embodiment of this application. The difference between this embodiment and the first embodiment is that: in this embodiment, the intelligent photography system further includes a monitoring camera, before acquiring a target positioning image shot by the search camera and transmitting the target positioning image to a remote terminal, the photography control method further includes operations as follows.

S10a, acquiring an environmental monitoring image shot by the monitoring camera.

S10b, transmitting the environmental monitoring image to the remote terminal.

S10c, receiving a shooting search instruction sent by the remote terminal.

S10d, controlling the search camera to shoot according to the shooting search instruction.

This application performs security investigations around the intelligent photography system through the monitoring camera to ensure that the intelligent photography system is in a safe environment. Through real-time monitoring at the remote terminal, it ensures that the surrounding environment of the intelligent photography system will not affect shooting, and if there is a special situation, the photographer may quickly learn about the surrounding situation, so as to react.

Figure 4:
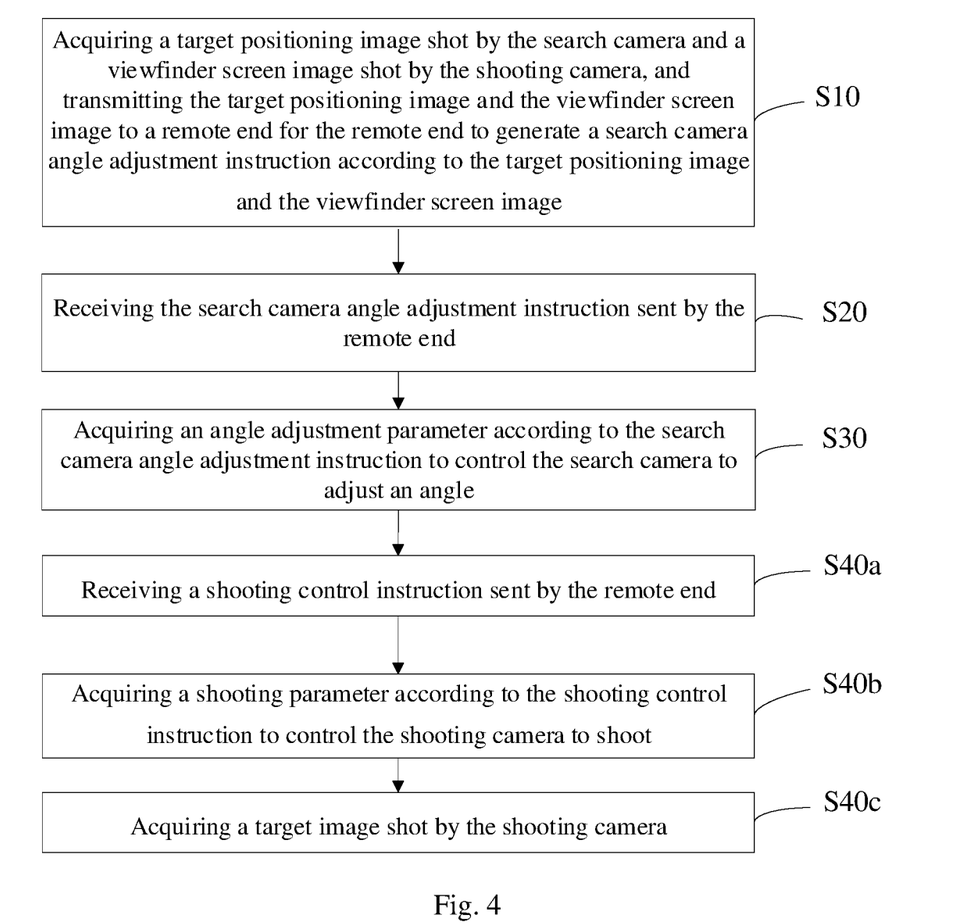
FIG. 4 is a schematic flowchart of the photography control method of the intelligent photography system according to a third embodiment of this application.

Please refer to FIG. 4, FIG. 4 is a schematic flowchart of the photography control method of the intelligent photography system according to a third embodiment of this application. The difference between this embodiment and the first embodiment is that: in this embodiment, after acquiring an angle adjustment parameter according to the search camera angle adjustment instruction to control the search camera to adjust an angle, the photography control method further includes operations as follows.

S40a, receiving a shooting control instruction sent by the remote terminal.

S40b, acquiring a shooting parameter according to the shooting control instruction to control the shooting camera to shoot.

S40c, acquiring a target image shot by the shooting camera.

This application may search the target area as much as possible through the wide-angle lens of the search camera, so that the target image required by the photographer in the target area may be found in time, and the shooting camera is controlled at the remote terminal to shoot to obtain the desired target image. Shooting through the remote terminal ensures that the shooting camera may shoot in a special environment without being affected by the photographer, thereby effectively protecting the safety of the photographer, and preventing missed targets due to the inability to find the target.

Figure 5:
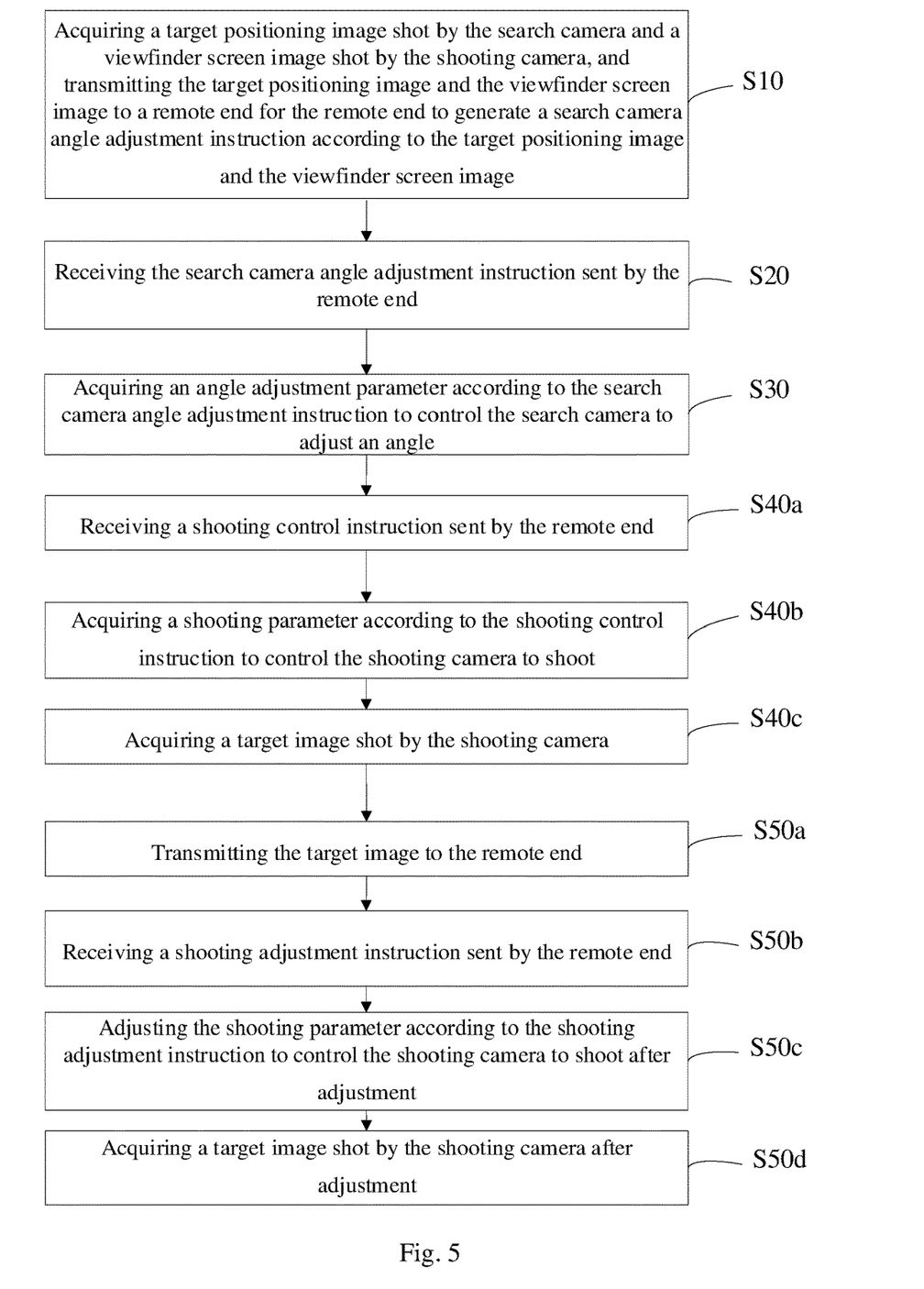
FIG. 5 is a schematic flowchart of the photography control method of the intelligent photography system according to a fourth embodiment of this application.

Please refer to FIG. 5. FIG. 5 is a schematic flowchart of the photography control method of the intelligent photography system according to a fourth embodiment of this application. The difference between this embodiment and the third embodiment is that: in this embodiment, after acquiring a target image shot by the shooting camera, the photography control method further includes operations as follows.

S50a, transmitting the target image to the remote terminal.

S50b, receiving a shooting adjustment instruction sent by the remote terminal.

S50c, adjusting the shooting parameter according to the shooting adjustment instruction to control the shooting camera to shoot after adjustment.

S50d, acquiring a target image shot by the shooting camera after adjustment.

In this application, the target image is transmitted to the remote terminal in real time, so that the photographer may make real-time adjustments at the remote terminal to obtain the best target image. The workload of the photographer may be effectively reduced by adjusting the shooting parameters remotely. After setting the intelligent photography system, there is no need to adjust back and forth, which ensures that the timing of shooting will not be missed due to the adjustment of the intelligent photography system, and protects the photographer in a safe and comfortable environment.

It should be noted that in this embodiment, the type of the remote terminal is not limited, and it may be a mobile phone, a computer, a tablet, a customized operating handle, and so on.

Further, in order to facilitate the intelligent photography system to shoot the target image, in this embodiment, the shooting parameters may include: a rotation angle of the intelligent photography system along a horizontal axis, a rotation angle of the intelligent photography system along a vertical axis, and a focal length of the shooting camera.

In this embodiment, by setting the shooting parameters as the rotation angle of the intelligent photography system along the horizontal axis, the rotation angle of the intelligent photography system along the vertical axis, and the focal length of the shooting camera, the intelligent tripod head may rotate in multiple directions to facilitate shooting target images. The focal length of the shooting camera may be remotely adjusted, so that the photographer may obtain a clear target image.

It should be noted that the shooting parameters may also include shooting parameters such as the aperture, sensitivity, and focus of the shooting camera, so that the photographer may shoot the target image with artistic effects.

Figure 6:
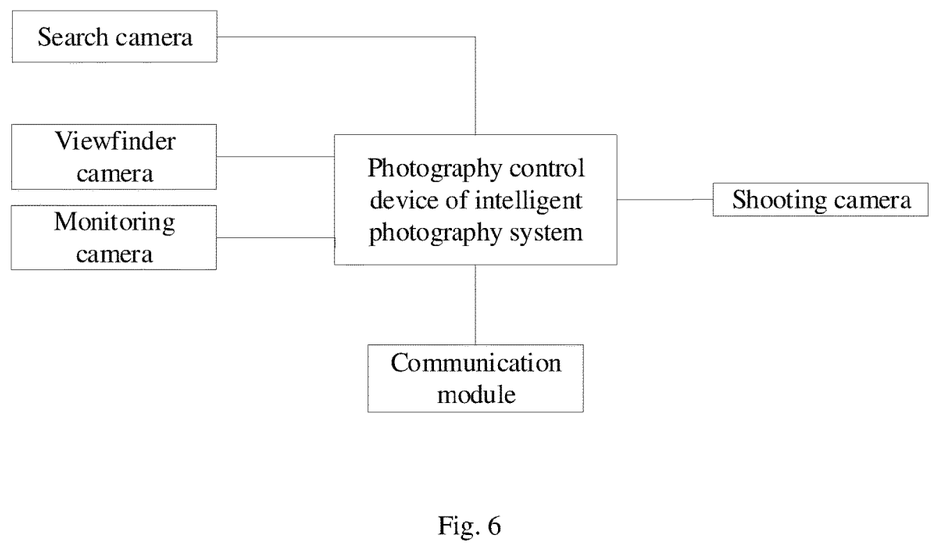
FIG. 6 is a schematic structural diagram of an intelligent photography system according to an embodiment of this application.

This application provides an intelligent photography system. FIG. 6 is a schematic structural diagram of the intelligent photography system according to an embodiment of this application.

Referring to FIG. 6, the intelligent photography system includes a intelligent tripod head, a shooting camera, a search camera, a communication module, and a photography control device of the intelligent photography system. The search camera includes a wide-angle lens and fixed on the shooting camera, and the search camera is configured for shooting a target positioning image. The shooting camera includes a camera lens, the camera lens and the wide-angle lens have a same orientation. The shooting camera is installed on the intelligent tripod head and configured for shooting the target image. The communication module is fixed on the intelligent tripod head and configured for communicating with the remote terminal. The photography control device of the intelligent photography system is fixedly installed on the intelligent tripod head, and is electrically connected to the intelligent tripod head, the shooting camera, the search camera and the communication module.

In this application, the photography control device of the intelligent photography system is electrically connected to the intelligent tripod head, the shooting camera, the search camera, and the communication module, and is configured for controlling the up and down rotation of the search camera. In this way, the screen displayed by the target search may basically overlap with the screen of the shooting camera, which facilitates shooting the screen displayed by the target search in time, thereby obtaining the best shooting opportunity and better shooting effect.

It should be noted that the intelligent photography system further includes a viewfinder camera fixed on the shooting camera to acquire the viewfinder screen image of the shooting camera. The intelligent photography system further includes a monitoring camera to acquire the environmental monitoring image shot by the monitoring camera. The viewfinder camera and the monitoring camera may exist at the same time in the embodiments, or may exist separately, and there is no limitation here.

The above is only optional embodiments of this application, and thus does not limit the scope of this application, and the equivalent structural transformation made by the content of the specification and the drawings of this application, or directly/indirectly applied to other related technical fields are all included in the patent protection scope of this application.

What is claimed is:

1. A photography control method of an intelligent photography system, wherein the intelligent photography system comprises a search camera and a shooting camera, and the photography control method of the intelligent photography system comprises:

acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image;

receiving the search camera angle adjustment instruction sent by the remote terminal;

acquiring an angle adjustment parameter according to the search camera angle adjustment instruction to control the search camera to adjust an angle;

receiving a shooting control instruction sent by the remote terminal;

acquiring a shooting parameter according to the shooting control instruction to control the shooting camera to shoot;

acquiring a target image shot by the shooting camera;

transmitting the target image to the remote terminal;

receiving a shooting adjustment instruction sent by the remote terminal;

adjusting the shooting parameter according to the shooting adjustment instruction to control the shooting camera to shoot after adjustment; and acquiring a target image shot by the shooting camera after adjustment.

2. The photography control method of the intelligent photography system of claim 1, wherein the search camera is located above the shooting camera and is rotatable in up and down direction for adjustment; and in the operation of acquiring an angle adjustment parameter according to the search camera angle adjustment instruction to control the search camera to adjust an angle: the angle adjustment parameter is a pitch angle of the search camera flipping up and down.

3. The photography control method of the intelligent photography system of claim 1, wherein in the operation of acquiring a target positioning image shot by the search camera and a viewfinder screen image shot by the shooting camera, and transmitting the target positioning image and the viewfinder screen image to a remote terminal for the remote terminal to generate a search camera angle adjustment instruction according to the target positioning image and the viewfinder screen image: the target positioning image and the viewfinder screen image are transmitted to the remote terminal by wired transmission; and/or, the intelligent photography system further comprises a viewfinder camera, and in the operation of acquiring a viewfinder screen image shot by the shooting camera: the viewfinder screen image shot by the shooting camera is acquired through the viewfinder camera.

4. The photography control method of the intelligent photography system of claim 1, wherein the intelligent photography system further comprises a monitoring camera, before the operation of acquiring a target positioning image shot by the search camera and transmitting the target positioning image to a remote terminal, the photography control method further comprises:

acquiring an environmental monitoring image shot by the monitoring camera;

transmitting the environmental monitoring image to the remote terminal;

receiving a shooting search instruction sent by the remote terminal; and controlling the search camera to shoot according to the shooting search instruction.

5. A photography control device of an intelligent photography system, comprising a memory, a processor, and a photography control program of the intelligent photography system stored on the memory and executable on the processor, and the photography control program of the intelligent photography system is configured to implement the operations of the photography control method of the intelligent photography system as recited in claim 1.

6. A non-transitory storage medium, wherein a photography control program of an intelligent photography system is stored thereon, and the operations of the photography control method of the intelligent photography system as recited in claim 1 are implemented when the photography control program of the intelligent photography system is executed by a processor.

7. An intelligent photography system, comprising: an intelligent tripod head, a search camera, a shooting camera, a communication module and a photography control device of the intelligent photography system; wherein, the search camera comprises a wide-angle lens and is fixed on the shooting camera for shooting a target positioning image;

the shooting camera comprises a camera lens, an orientation of the camera lens is the same as an orientation of the wide-angle lens, and the shooting camera is installed on the intelligent tripod head to shoot a target image;

the communication module is fixed on the intelligent tripod head for communication with a remote terminal; and the photography control device of the intelligent photography system is fixedly installed on the intelligent tripod head and is electrically connected to the intelligent tripod head, the shooting camera, the search camera, and the communication module, and the photography control device of the intelligent photography system comprises a memory, a processor, and a photography control program of the intelligent photography system stored on the memory and executable on the processor, and the photography control program of the intelligent photography system is configured to implement operations:

acquiring a target positioning image shot by the search camera and a viewfinder screen image shot by the shooting camera, and transmitting the target positioning image and the viewfinder screen image to the remote terminal for the remote terminal to generate a search camera angle adjustment instruction according to the target positioning image and the viewfinder screen image;

receiving the search camera angle adjustment instruction sent by the remote terminal; and acquiring an angle adjustment parameter according to the search camera angle adjustment instruction to control the search camera to adjust an angle.

8. The intelligent photography system of claim 7, further comprising a viewfinder camera fixed on the shooting camera for acquiring a viewfinder image of the shooting camera; and/or, the intelligent photography system further comprises a monitoring camera for acquiring an environmental monitoring image shot by the monitoring camera.

* * * * *